United States Patent [19]
Albert

[11] 3,898,663
[45] Aug. 5, 1975

[54] RETRODIRECTIVE TRANSPONDER

[75] Inventor: Joseph J. Albert, Orlando, Fla.

[73] Assignee: The United States of America as represented by the Secretary of the Air Force, Washington, D.C.

[22] Filed: Apr. 1, 1970

[21] Appl. No.: 24,940

[52] U.S. Cl............................ 343/100 TD; 343/18 D
[51] Int. Cl.² ........................................... H04B 7/04
[58] Field of Search........ 343/18 C, 18 D, 753, 770, 343/776, 100 TD

[56] References Cited
UNITED STATES PATENTS

| | | | |
|---|---|---|---|
| 3,150,320 | 9/1964 | Gruenberg.................... | 343/100 TD |
| 3,196,438 | 7/1965 | Kompfner..................... | 343/100 TD |
| 3,273,151 | 9/1966 | Cutler et al. ................. | 343/100 TD |
| 3,334,346 | 8/1967 | Crawford et al. ............ | 343/100 TD |
| 3,350,642 | 10/1967 | Stahler ......................... | 343/100 TD |

*Primary Examiner*—Malcolm F. Hubler
*Attorney, Agent, or Firm*—Joseph E. Rusz; George Fine

[57] ABSTRACT

A retrodirective transponder wherein pairs of elementary radiators are connected by equal lengths of transmission lines so that the re-radiated wavefront is parallel to the incident wave front permitting the re-radiated signal to be beamed in the direction of the illuminating transmitters. The re-radiated wavefront is frequency translated from the incident wave to avoid ringing of the transponder.

2 Claims, 4 Drawing Figures

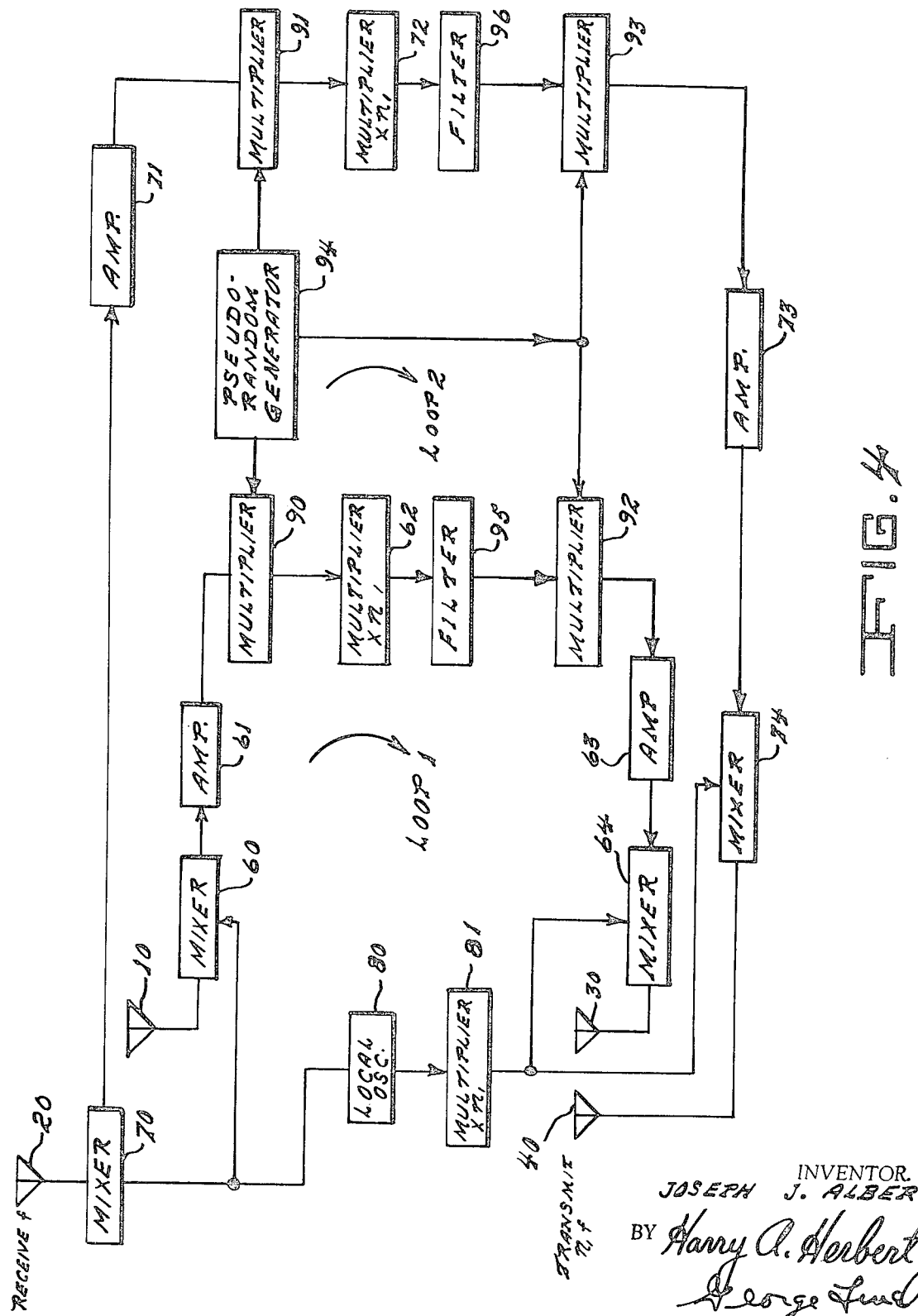

RETRODIRECTIVE TRANSPONDER

BACKGROUND OF THE INVENTION

The retrodirective transponder concept is based on the particular retrodirective structure called the Van Atta array as described in U.S. Pat. No. 2,908,002. A Van Atta array performs the same function as a corner reflector, returning a beam of energy in the direction of the incident illumination. By connecting pairs of elementary radiators by equal length transmission lines, the re-radiated wave front is parallel to the incident wave front so that the re-radiated signal is beamed in the direction of the illuminative transmitter.

Van Atta and others have discussed employing circulators (duplexers) and amplifiers in the transmission lines connecting pairs of elementary radiators, such an array can re-radiate a signal stronger than the incident illumination (and of course in the direction of the illuminating transmitter).

It is evident that the phasing can be established by a single spectral component (carrier) so that it is possible to extract from the incident signal and impart information to the re-radiated signal (while maintaining retrodirective performance). When this is done, the array should perhaps be called a retrodirective receiver-transmitter.

There are two major undesirable characteristics of the common active Van Atta array (transponder). Retrodirective structure is ordinarily not very discriminating insofar as the signals it re-radiates are concerned. It will re-radiate a signal to an enemy jammer as easily as it re-radiates a desired signal. An active Van Atta array is difficult to implement. To achieve high amplification figures in active Van Atta arrays, frequency-offset techniques must be employed. The percentage difference between input and output frequencies must be kept small, however, because of the occurrence of a beam shift, which is a function of the frequency offset and the entrance angle.

Corresponding to these major difficulties are major objectives of this invention. One is to provide retrodirective performance in the presence of a strong jamming field. Another is to eliminate the difficult duplexing problem and beam shift which ordinarily accompanies a frequency shift. An incidental objective is to preserve the inherent characteristic of retrodirective structure which permits accurate velocity measurement of a vehicle bearing such structure. The phase of the re-radiated signal is determined by the phase of the incident signal. To avoid the beam shift and incidentally preserve the velocity measuring capabilities frequency translation can be employed.

A transponder including a combination of a Van Atta array and frequency translation means will provide retrodirective performance and preserve Doppler information inspite of frequency translation. The frequency translation alleviates the duplexing problem.

SUMMARY OF THE INVENTION

A retrodirective transponder is provided by this invention by combining a Van Atta array with frequency translation means. The Van Atta array's obtained by connecting pairs of elementary radiators by equal length transmission lines, the re-radiated wave front is parallel to the incident wave front so that the re-radiated signal is beamed in the direction of the illuminating transmitter. Frequency translation means are included in the structure of the Van Atta array so that the input and output frequencies are different thereby avoiding difficult duplexing problems. Since the output carrier frequency is determined precisely by the input carrier frequency, a precise measure of vehicle radial velocity is obtainable from doppler measurements of the returned signal.

An object of the present invention is to provide a retrodirective transponder combining a Van Atta array with frequency translation.

Another object of the present invention is to provide a retrodirective transponder wherein the re-radiated wave front is parallel to the incident wavefront with the re-radiated wavefront being frequency translated.

Yet another object of the present invention is to provide a retrodirective transponder incorporating frequency translation.

These and other advantages, features and objects of the invention will become more apparent from the following description taken in connection with the illustrative embodiments in the accompanying drawings.

DESCRIPTION OF DRAWINGS

FIG. 4 shows a modification of the system of FIG. 3 to provide pseudo-random demodulation and modulation.

DESCRIPTION OF PREFERRED EMBODIMENT

Figure 1:
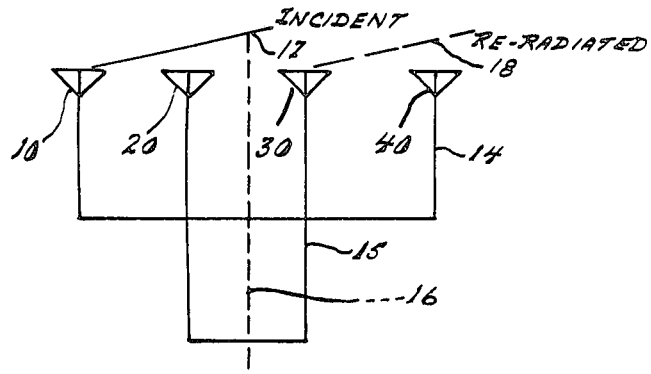
FIG. 1 shows the basic Van Atta array.

Now referring to FIG. 1, there is shown a basic Van Atta array utilized to clarify and explain this invention. There is shown antenna elements 10, 20, 30 and 40. Antenna elements 10 and 40 are connected by transmission line 14 and 20 and 30 by transmission line 15. Lines 14 and 15 are of equal length. Thus, pairs of elementary radiators are connected by equal length transmission lines. Dotted line 16 is the line of symmetry. There is also shown incident wave front path 17 and re-radiated wave front path 18. The re-radiated wave front is parallel to the incident wave front so that the re-radiated signal is beamed in the direction of the illuminating transmitter.

Figure 2:
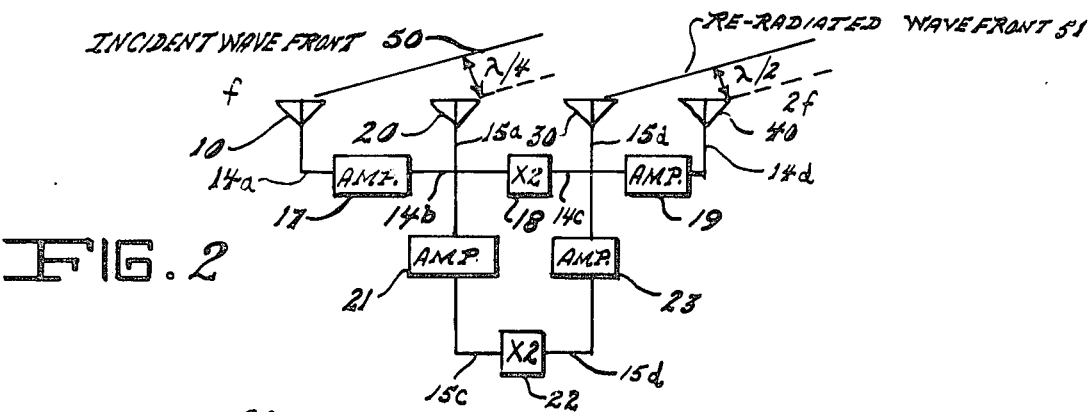
FIG. 2 shows in block diagram form the introduction of frequency translation in the retrodirective transponder yielding retrodirectivity without a beam shift.

Now referring to FIG. 2, there is shown the basic Van Atta array of FIG. 1 combined with frequency translation means. Receiving antenna element 10 is connected to transmitting antenna element 40 by way of transmission line 14a, amplifier 17, transmission line 14b, multiplier 18, transmission line 14c, amplifier 19, and transmission line 14d. Receiving antenna element 20 is connected to transmitting antenna element 30 by way of transmission line 15a, amplifier 21, transmission line 15c, multiplier 22, transmission line 15d, amplifier 23, and transmission line 15d. Transmission lines 14a through 14d are equal to transmission lines 15a through 15d. Multipliers 18 and 22 are in this instance designed to multiply by two.

The signal from incident wave front 50 originated by an illuminating transmitter is received by antenna elements 10 and 20, amplified in amplifiers 17 and 21, multiplied by two in multipliers 18 and 22, amplified again in amplifiers 19 and 23, and then transmitted by antenna elements 30 and 40, respectively. The transmitted signal is incidated as re-radiated wave front 51. The re-radiated signal is much stronger than the incident signal. The re-radiated signal is parallel to the incident signal and is beamed in the direction of the illuminating transmitter. Still further the re-radiated signal is precisely at twice the frequency of the incident signal. A retrodirective transponder is thus provided which eliminates the difficult duplexing problem and beam shift which ordinarily accompanies a frequency shift. The inherent characteristic of retrodirective structure which permits accurate velocity measurement of a vehicle bearing such structure is preserved.

Note that the phase of the output signal is determined by the phase of the input signal and that one cycle of phase at the input corresponds to two cycles at the output. The structure is retrodirective in spite of the large frequency shift. A phase difference between "receiver" elements of 90° (corresponding to one quarter wavelength at the input elements 10 and 20 frequency) is converted to 180° at the output elements, 30 and 40 (corresponding to one half wavelength), exactly compensating for the reduced wavelength to yield a re-radiated wavefront parallel to the incident wavefront.

Figure 3:
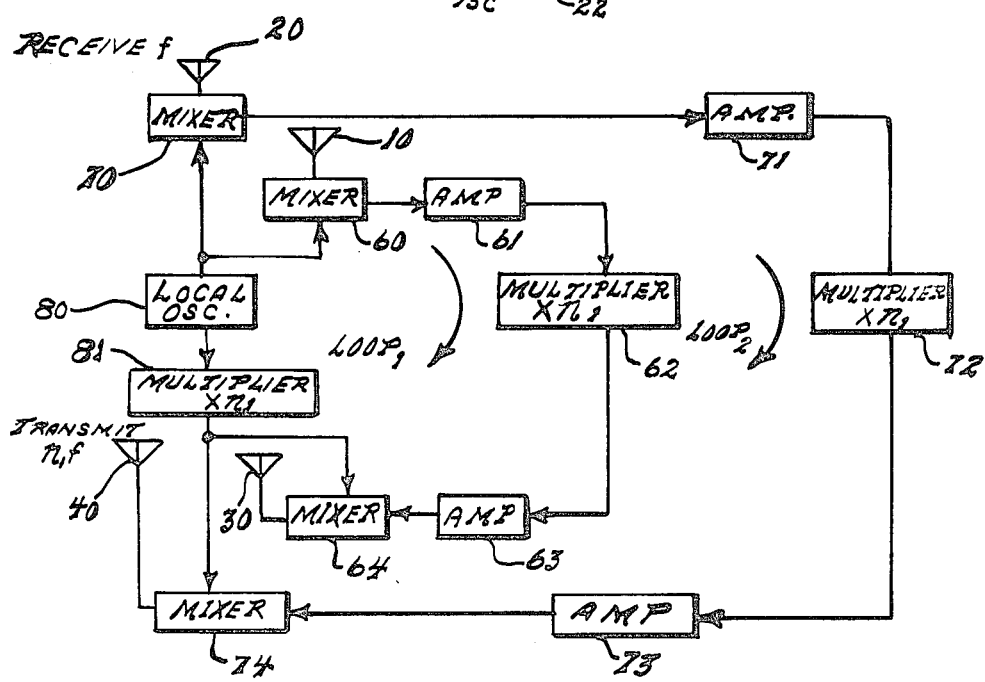
FIG. 3 shows in block diagram form the retrodirective transponder using superheterodyne techniques.

Now referring to FIG. 3 in which the frequency translation includes superheterodyne operation to permit substantial gain and selectivity at an IF frequency. A retrodirective antenna array is utilized in combination with the frequency translation apparatus. The retrodirective antenna may again be such as the basic Van Atta array as detailed hereinbefore. The incident signal is again received by antenna elements 10 and 20 and transmitted by antenna elements 30 and 40. There is provided two loops. Loop 1 connects antenna element 10 to antenna element 30 and loop 2, antenna element 20 to antenna element 40. Loop 1 is comprised of a mixer 60, amplifier 61, multiplier 62 (multiply by $n_1$), amplifier 63 and mixer 64 connected in cascade. Mixer 60 is interconnected to mixer 64 by local oscillator 80 and multiplier 81 (multiply by $n_1$). Loop 2 is comprised of mixer 70, amplifier 71, multiplier 72 (multiply by $n_1$), amplifier 73, and mixer 74 connected in cascade. Mixer 70 is interconnected to mixer 74 by local oscillator 80 and multiplier 81.

In order to clarify the operation of the retrodirective transponder of FIG. 3, the signals for a single loop are given. The same type of signals are also present in loop 2. Now referring to loop 1, the output of local oscillator 80 is $f_1 \pm \Delta f$. The inputs to mixer 60 are $f$, and the output of oscillator 80. The output of mixer 60 is $f - (f_1 \pm \Delta f) = f - f_1 \pm \Delta f$. The output of multiplier 62 is $n_1 f - n_1 f_1 \mp n_1 \Delta f$, which is amplified by amplifier 63 prior to injection at mixer 64. The output of mixer 64 is $n_1 f - n_1 f_1 \mp n_1 \Delta f + n_1 f_1 \mp n_1 \Delta f = n_1 f$. The re-radiated signal is $n_1 f$ and the received (incident) signal is $f$.

The frequency translations around each loop from antenna 10 to 30 and 20 to 40 result in cancellation of local oscillator phase and phase rate. Hence the phase at transmit antenna element 30 is determined by the phase at receive antenna element 10 and phase at transmit antenna element 40 is determined by phase at receive antenna element 20. With equal spacing of the receiver elements, the transponder is retrodirective since differential phase angles are multiplied by the factor $n_1$ which inherently compensates for the change of wavelength (from received to transmitted) to yield a wavefront parallel with the incident wavefront. To those skilled in the art, it is evident that the translations of frequency can include translation from spread spectrum signals to sinusoids and vice versa.

Note that the phase and phase rate of the local oscillator signal is cancelled so that the output (re-radiated) signal phase is determined by the input (incident) signal phase. Using this technique, frequency translation other than harmonically related translations are possible.

It is emphasized that the frequency translations can be from spread spectrum to sinusoid and vice versa as shown in FIG. 4. In other words a stored reference pseudo-noise signal synchronized to the desired signal (via a tracking loop) can be employed so that the product of these two signals yield a sinusoid. When this is done, an uncorrelated jamming signal is rejected in proportion to the bandwidth ratio of the system. The array (receiver-transmitter) as a whole then becomes retrodirective only in response to the desired encoded signal in spite of the presence of a strong jamming field, and the re-radiated signal can be made difficult to detect by employing pseudo random modulation prior to re-radiation.

Now referring to FIG. 4, there is shown a modification of FIG. 3 to provide the aforementioned pseudo-random demodulation and modulation. The components in FIG. 4 are identical to those utilized in FIG. 3 but there has been added multipliers 90, 91, 92 and 93 pseudo-random generator 94 and filters 95, 96. Conventional pseudo-random generator 94 provides a pseudo-random signal simultaneously to multipliers 90, 91, 92 and 93. Amplifiers 61 and 71 also provide signals to multipliers 90 and 91, respectively. Multipliers 62 and 72 receive the outputs from multipliers 90 and 91, respectively. The outputs from multipliers 62 and 72 are fed to multipliers 92 and 93 by way of filters 95 and 96 respectively.

I claim:

1. A retrodirective transponder comprising a retrodirective antenna array having at least first and second receiving antennas receiving a signal from an illuminating transmitter, at least first and second transmitting antennas re-radiating a signal parallel to the received signal and towards said illuminating transmitter, said first receiving and transmitting antennas being a first pair and said second receiving and transmitting antennas being a second pair, a first cascaded electrical loop interconnecting said first receiving and transmitting antennas consisting of a first mixer, a first amplifier, a first preselected frequency multiplier, a second amplifier, and a second mixer, a second cascaded electrical loop interconnecting said second receiving and transmitting antenna, said second cascaded electrical loop consisting of a third mixer, a third amplifier, a second preselected frequency multiplier, a fourth amplifier, and a fourth mixer, said first and second cascaded electrical loops being of equal length, a common local oscillator having a predetermined frequency output signal, said predetermined frequency output signal being injected into said first and third mixers, and a third preselected frequency multiplier interconnecting said common local oscillator and said second and fourth mixers.

2. A retrodirective transponder comprising a retrodirective antenna array having at least first and second receiving antennas receiving a signal from an illuminating transmitter, at least first and second transmitting antennas re-radiating a signal parallel to the received signal and toward said illuminating transmitter, said first receiving and transmitting antennas being a first pair and said second receiving and transmitting antennas being a second pair, a first cascaded loop interconnecting said first receiving and transmitting antennas and consisting of a first mixer, a first amplifier, a first multiplier, a second multiplier, a first filter, a third multiplier, a second amplifier, and a second mixer, a second cascaded loop interconnecting said second receiving antenna and transmitting antenna and consisting of a third mixer, a third amplifier, a fourth multiplier, a fifth multiplier, a second filter, a sixth multiplier, a fourth amplifier, a fourth mixer, and a pseudo-random generator providing simultaneously output signals to said first, third, fourth, and sixth multipliers.

* * * * *